Nov. 16, 1965  S. P. JACKSON  3,218,540
CURRENT SUPPLY APPARATUS
Filed Nov. 1, 1960  2 Sheets-Sheet 2
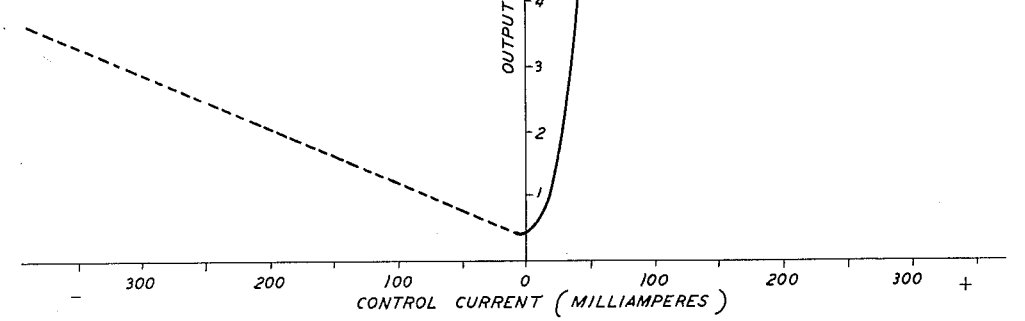
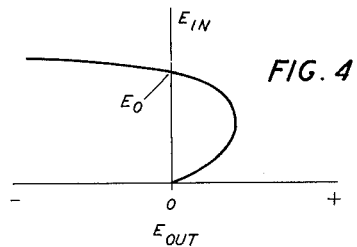
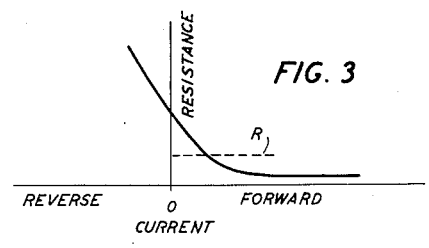
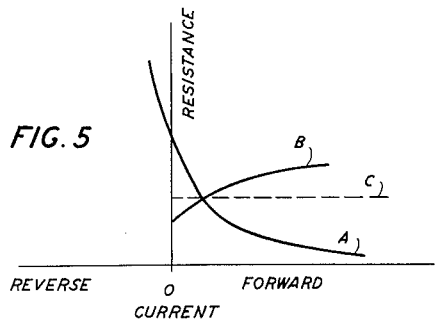
INVENTOR
S. P. JACKSON
BY
ATTORNEY United States Patent Office 3,218,540
Patented Nov. 16, 1965

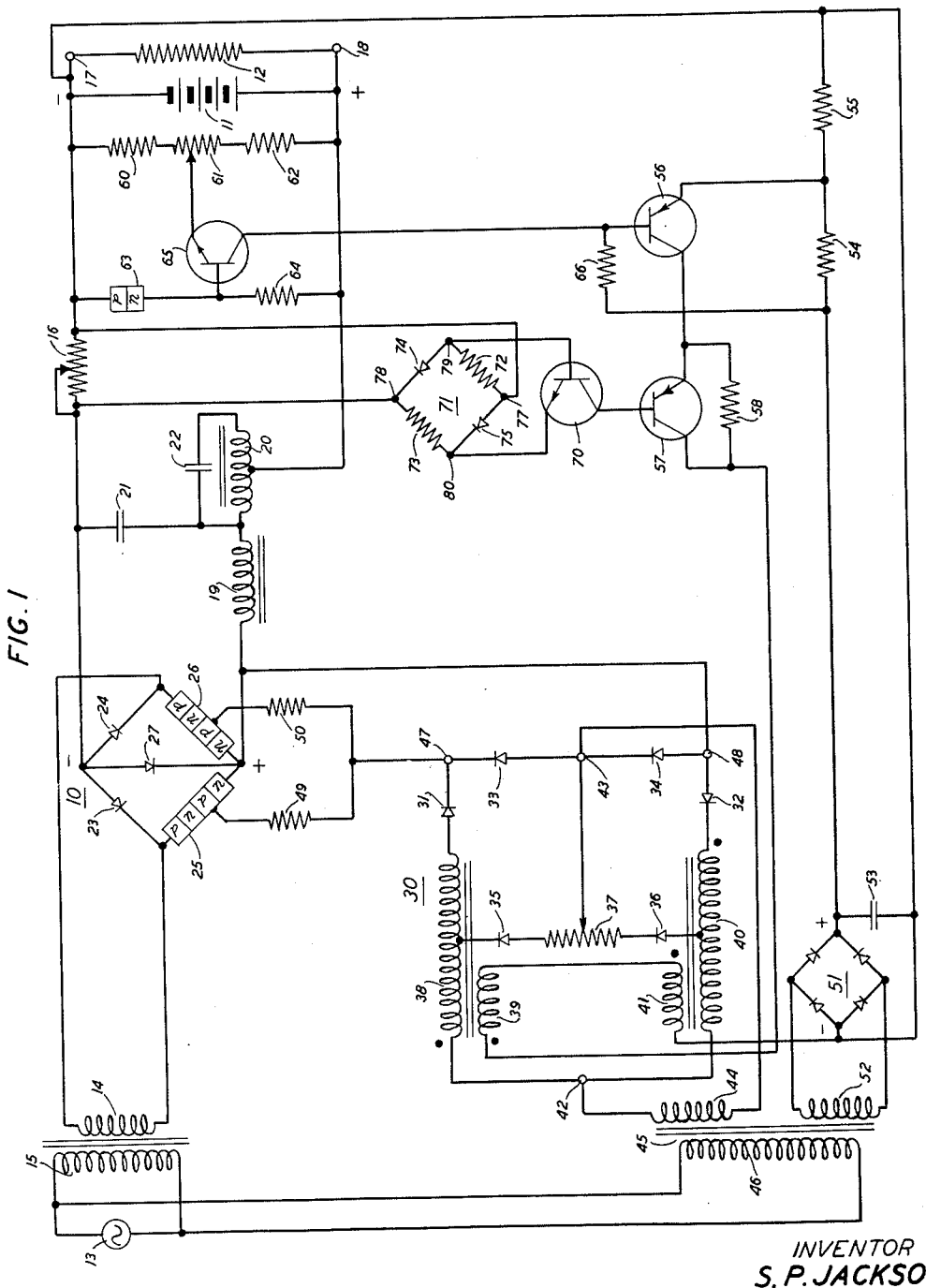
FIG. I
INVENTOR
S. P. JACKSON
BY
G. J. Heuerman
ATTORNEY

3,218,540
CURRENT SUPPLY APPARATUS
Stuart P. Jackson, Columbus, Ohio, assignor, by mesne assignments, to North Electric Company, Galion, Ohio, a corporation of Ohio
Filed Nov. 1, 1960, Ser. No. 66,653
16 Claims. (Cl. 321—18)

This invention relates to current supply apparatus and particularly to apparatus for controlling the supply of rectified current from an alternating-current supply source to a load circuit.

An object of the invention is to provide improved apparatus for controlling the supply of rectified current to a load to minimize load voltage changes over a predetermined operating range of load current.

In a specific embodiment of the invention, herein shown and described for the purpose of illustration, current is supplied from an alternating-current supply source to the input of a first bridge rectifier from the output of which rectified current is supplied to a load circuit including a load. A pair of silicon p-n-p-n semiconductor devices are provided in a pair of adjacent arms of the bridge for controlling the rectifier output in response to current supplied to a control p-n junction of each of the p-n-p-n devices. A second bridge rectifier is provided for supplying rectified control current from its output to each of the control p-n junctions of the p-n-p-n devices when current from the alternating-current supply source is supplied to first and second opposite input vertices of the second bridge rectifier. There are provided a first and a second saturable reactor each having a gate winding and a control winding on a core of preferably substantially square hysteresis loop magnetic material. The two gate windings are connected in adjacent arms of the second bridge rectifier, these windings having a common terminal connected to the first input terminal of the bridge. Each of the gate windings has a terminal intermediate its end terminals and there is provided for interconnecting the intermediate terminals a current path comprising a first rectifying element, a potentiometer and a second rectifying element in series. The movable tap of the potentiometer is conductively connected to the second input terminal of the second bridge rectifier. The rectifying elements are poled so that, during a positive half cycle period of the alternating-current source when the first input terminal is positive with respect to the second input terminal, current will flow through a portion of a first of the gate windings, the first rectifying element in its relatively low resistance direction, and a portion of the potentiometer resistance in series and, during a negative half cycle period when the second input terminal is positive with respect to the first input terminal, current will flow through the remaining portion of the potentiometer resistance, the second rectifying element in its relatively low resistance direction and a portion of the second gate winding in series.

A unidirectional control current is supplied to the control winding of each saturable reactor in a direction such that the magnetomotive force due to current in the control winding and the magnetomotive force due to current flowing through the entire gate winding are aiding in the magnetic circuit of the saturable reactor. The magnetomotive force due to current flowing in the control winding of each saturable reactor is opposed to the magnetomotive force due to the current flowing through a portion only of its gate winding. The control current is supplied to the control windings through the emitter-collector paths, in series, of a first and a second transistor. There is supplied to the emitter-base path of the first transistor a current which decreases in response to an increase of load voltage, for example, to cause the resistance of the emitter-collector path of the first transistor to increase in response to an increase of load voltage and vice versa.

The resistance of the emitter-collector path of the second transistor is controlled in response to load current, the transistor being substantially fully conducting when the load current is within a predetermined normal operating range and being substantially non-conducting when the load current exceeds the maximum current of the normal operating range. For controlling the second transistor, there is provided a third bridge circuit having substantially identical rectifying elements in a pair of opposite arms of the bridge and having substantially identical resistors in the remaining pair of opposite arms. A voltage proportional to load current is impressed upon one pair of opposite vertices of the bridge and the voltage across the remaining pair of opposite bridge vertices is utilized to control the emitter-base current of the second transistor.

When the load current is within a normal operating range, a decrease of load voltage, for example, will cause the emitter-collector resistance of the first transistor to decrease, thus causing the current supplied to the control windings of the saturable reactors to increase. The reactors thus saturate relatively earlier during alternate half cycle periods of the alternating-current source respectively to cause the p-n-p-n devices to become conducting relatively earlier in the successive half cycle periods. The current supplied from the output of the first bridge rectifier to the load circuit is thus increased to cause the initially assumed decrease of load voltage to be minimized. When the load current exceeds the maximum amplitude of the normal operating range, the second transistor is made substantially non-conducting to cause the current supplied to the control windings to be abruptly reduced or substantially interrupted. Each saturable reactor thus becomes saturated very late in each half cycle period or fails to reach saturation, thus causing the output of the first bridge rectifier which is supplied to the load circuit to be abruptly reduced.

The invention will now be described in greater detail with reference to the accompanying drawing in which:

FIG. 1 is a schematic view of a current supply circuit embodying the invention; and FIGS. 2, 3, 4 and 5 are graphs to which reference will be made in explaining the operation of the circuit of FIG. 1.

Referring now to the drawing, there is provided a bridge rectifier 10 for supplying rectified current from its output terminals to a load circuit comprising a load, such as a storage battery 11 and a dissipative load 12 connected across the battery, when current from an alternating-current supply source 13 is supplied to the input terminals of the bridge rectifier. The input terminals of rectifier 10 are connected to the secondary winding 14 of a transformer whose primary 15 is connected to the source 13. The negative output terminal of rectifier 10 is connected through a variable resistor or rheostat 16 to the negative load terminal 17. The output current of rectifier 10 is supplied to the load through a ripple filter comprising series inductive reactors 19 and 20, a shunt condenser 21 and a condenser 22 connected across the inductor 20, the positive output terminal of rectifier 10 being connected to a terminal of inductor 19, and a terminal of inductor 20 intermediate its end terminals being connected to the positive load terminal 18. The bridge rectifier 10 comprises rectifying elements 23 and 24, silicon, for example, in two of its adjacent arms connected to the negative output terminal and silicon p-n-p-n semiconductor devices 25 and 26 in the remaining bridge arms connected to the positive output terminal. A rectifying element 27 is provided in a path connecting the output terminals of rectifier 10, the element 27 having its anode connected to the negative output terminal and its cathode connected to the positive output terminal.

Each of the p-n-p-n devices functions substantially as a switch controlled by a control current supplied through one of its p-n junctions. During a half cycle period of the supply source when the end p region of one of the devices is positive with respect to its end n region, the device has a high resistance and the current flow through it will be insignificantly small in the absence of a control current. A control current of suitable amplitude supplied through one of the p-n junctions causes the resistance of the device 25 or 26 to decrease abruptly with the result that the current flowing through the device to the output of rectifier 10 will increase abruptly. After being thus "turned on," conduction through the device continues for the remainder of the half cycle period. The devices 25 and 26, of course, function during alternate half cycle periods respectively.

For supplying control current to the p-n-p-n devices 25 and 26, there is provided a saturable reactor controlled bridge rectifier or magnetic amplifier 30. This bridge rectifier comprises six rectifying elements 31, 32, 33, 34, 35 and 36, a potentiometer 37 and two saturable reactors one of which has a gate winding 38 and a control winding 39 and the other of which has a gate winding 40 and a control winding 41. The windings of each reactor are wound on a core of preferably substantially square hysteresis loop magnetic material. One pair of opposite vertices of the bridge rectifier 30 are the input terminals 42 and 43 which are connected to the secondary 44 of a transformer 45 having a primary 46 connected to the supply source 13. The remaining opposite vertices of the bridge rectifier 30 are its positive and negative output terminals 47 and 48 respectively. The negative output terminal 48 of the bridge 30 is connected to an n region of each of the p-n-p-n devices 25 and 26, that is, to the positive output terminal of rectifier 10. The positive output terminal 47 of the bridge 30 is connected through a resistor 49 to an adjacent p region of the device 25 and through a resistor 50 to an adjacent p region of the device 26. During a half cycle period when terminal 42 is positive with respect to terminal 43, when gate winding 38 has a relatively low impedance due to saturation of its core, current of relatively large amplitude will flow from input terminal 42 through gate winding 38, rectifying element 31 and resistor 50 into the p region and out of the n region of the p-n-p-n device 26 and through rectifying element 34 to input terminal 43. Similarly, during a half cycle period when terminal 43 is positive with respect to terminal 42, when gate winding 40 has a relatively low impedance due to saturation of its core, current of relatively large amplitude will flow from input terminal 43 through rectifying element 33 and resistor 49, into the p region and out of the n region of the p-n-p-n device 25 and through rectifying element 32 and gate winding 40 to terminal 42. During normal operation, the devices 25 and 26 are thus made conductive during portions of alternate half cycle periods of the supply source 13.

The instant during alternate half cycle periods of the supply source at which the devices 38, 39 and 40, 41 become saturated and thus turn on or make conducting the devices 26 and 25, respectively, is determined by a unidirectional control current supplied to the control windings 39 and 41 in series from the output of a bridge rectifier 51. The input terminals of the rectifier 51 are connected to a secondary winding 52 of the transformer 45. A filter condenser 53 is connected across the output of rectifier 51 which supplies rectified current to a voltage divider comprising resistors 54 and 55 in series. The circuit for supplying current to the control windings may be traced from the positive terminal of rectifier 51, through resistor 54, into the emitter and out of the collector of a p-n-p type transistor 56, into the emitter and out of the collector of a p-n-p type transistor 57 and through control windings 39 and 41. A resistor 58 is provided in a path connecting the emitter and collector of transistor 57.

Two shunt current paths are connected across the load 11, 12. One of the paths comprises a resistor 60, a potentiometer 61 and a resistor 62 all in series. The second current path comprises a p-n junction constant voltage diode 63 and a resistor 64 in series. There is provided an n-p-n type transistor 65 having its emitter connected to the variable tap of potentiometer 61 and its base connected to the common terminal of the constant voltage diode 63 and resistor 64. The collector of transistor 65 is conductively connected to the base of transistor 56 and is also connected through a resistor 66 to the positive terminal of rectifier 51. The negative load terminal 17 is connected to the negative terminal of rectifier 51.

Transistor 57 is substantially fully conducting when the load current is within a predetermined normal operating range. The conduction of the transistor 56 varies in response to changes of load voltage. The substantially constant voltage across the diode 63 is somewhat larger than the voltage between the variable tap of potentiometer 61 and the negative load terminal. An increase of load voltage, for example, will therefore cause a reduction of the current flowing into the base and out of the emitter of transistor 65. As a result, the current flowing into the emitter and out of the base of transistor 56 and into the collector and out of the emitter of transistor 65 will decrease. Therefore, the control current supplied through the emitter-collector paths of transistors 56 and 57 to the control windings 39 and 41 will decrease in response to an increase of load voltage, for example.

When terminal 42 of bridge rectifier 30 is positive, current supplied through the entire gate winding 38 produces a magnetomotive force which is in aiding relationship to the magnetomotive force produced by the control current in winding 39 in the magnetic circuit of the saturable reactor 38, 39. During this half cycle period which we may identify as being positive, current is supplied from transformer secondary 44 to a circuit comprising a portion only of gate winding 40, rectifying element 36 and a portion of the resistance of potentiometer 37. This current flowing through a portion only of winding 40 produces a magnetomotive force which opposes the magnetomotive force due to the control current flowing through control winding 41. Similarly, during a succeeding negative half cycle period when terminal 42 is negative with respect to terminal 43, aiding magnetomotive forces are produced by the currents through windings 40 and 41, respectively, and opposing magnetomotive forces are produced by the currents through a portion only of winding 38 and through control winding 39, respectively. The magnetomotive force due to current flowing through a portion only of winding 40 during a positive half cycle period is larger than the magnetomotive force due to current in the control winding 41 and similarly, the magnetomotive force due to current flowing through a portion only of winding 38 during a negative half cycle period is larger than the magnetomotive force due to current in the control winding 39.

Therefore, a reduction of control current in response to an increase of load voltage results in an increased reset flux level of the core of the device 40, 41 in one direction, say, negative, during a positive half cycle period of the alternating-current source, and in an increased reset flux level of the core of the device 38, 39 in the negative direction during a negative half cycle period of the alternating-current source. During a positive half cycle period, the reduction of control current in response to the assumed increase of load voltage has the effect of reducing the instantaneous voltage across the winding 38. This effect and the increased reset flux level during the preceding negative half cycle period cause the reactor 38, 39 to reach positive saturation relatively later during the positive half cycle period of the alternating current. The p-n-p-n device 26 is thus made conducting relatively later in the positive half cycle period. So also, during a negative half cycle period, the reduction of control current has the effect of reducing the instantaneous voltage across the winding 40. This effect and the increased reset flux level during the preceding positive half cycle period causes the reactor 40, 41 to reach positive saturation relatively later during the negative half cycle period of the alternating current. The p-n-p-n device 25 is thus made conducting relatively later in the negative half cycle period. As a result, the average current supplied from the output of the controlled rectifier 10 to the load circuit is decreased to thus minimize the initially assumed increase of load voltage.

The adjustable tap of potentiometer 37 is set to compensate for any unbalance of the saturable reactors 38, 39 and 40, 41. The resistance of potentiometer 37 is selected so that when the control current supplied to control windings 39 and 41 is zero, the average output voltage of the bridge rectifier 30 is a minimum, as shown in FIG. 2. An increase of control current thus always results in an increase of output voltage. Since the control current is unidirectional, operation along the dashed portion of the curve shown in FIG. 2 is impossible. It will be observed that if the minimum output voltage occurred at a control current other than zero, the output voltage could increase in response to either an increase or a decrease of control current.

Another advantage of the circuit arrangement shown including the potentiometer 37 and rectifying elements 35 and 36 for supplying currents for resetting the flux levels of the cores of reactors 38, 39 and 40, 41 is that exciting current supplied through winding 38 or 40 and the load connected to output terminals 47 and 48 prior to saturation of the cores of the reactors, respectively, is considerably reduced. Moreover, a reduction of the response time results from the fact that any change in control current during a half cycle period prior to saturation of a reactor core, that is, prior to the instant that the firing angle is reached, results in change of output from the output terminals 47 and 48 during the same half cycle period.

The base of transistor 57 is connected to the collector of an n-p-n type transistor 70. There is provided a bridge circuit 71 having substantially equal resistors 72 and 73 respectively in one pair of opposite arms and like rectifying elements 74 and 75, respectively, silicon, for example, in the remaining pair of opposite arms. Positive and negative input terminals 77 and 78 respectively are formed by one pair of opposite vertices of the bridge. The positive and negative terminals of resistor 16 are connected to terminals 77 and 78, respectively. Positive and negative output terminals 79 and 80, respectively, formed by the remaining opposite vertices of the bridge, are connected to the base and emitter respectively of transistor 70.

When load current is flowing through resistor 16 to produce a voltage drop thereacross, current flows through resistor 72 and the forward resistance of rectifying diode 74 in series and through the forward resistance of rectifying diode 75 and resistor 73 in series. Each of the rectifying diodes 74 and 75 may have a resistance-current characteristic as depicted in FIG. 3, for example, the dash line R indicating the resistance of each of resistors 72 and 73 when these elements have a fixed resistance. The curve of FIG. 4 shows the relationship between the input voltage $E_{in}$ across input terminals 77 and 78 and the output voltage $E_{out}$ across output terminals 79 and 80. As shown by the curve, when the input voltage is zero, the output voltage is also zero. If the input voltage is increased from zero, the output voltage increases to a maximum in the positive direction, then decreases to zero at a value of input voltage designated $E_0$. At this input voltage the forward resistance of each of the rectifying diodes equals the resistance of each of resistors 72 and 73 and the bridge is balanced. If the input voltage is further increased, the output voltage reverses and increases in the negative direction.

When the load current is within a normal operating range, the variable resistor 16 is adjusted to produce an input voltage $E_{in}$ across the terminal 77 and 78 which is greater than zero and less than the value $E_0$, as shown in the diagram of FIG. 4. For this condition, the transistors 70 and 57 are substantially fully conducting. If the load current should exceed the maximum of the normal operating range, the bridge input voltage $E_{in}$ would become larger than $E_0$ and the bridge output voltage would reverse, terminal 80 becoming positive and terminal 79 becoming negative. The emitter-collector impedance of each of transistors 70 and 57 thus increases abruptly, that is, these transistors change abruptly from a substantially fully conducting state to a substantially non-conducting or cut-off state. Under this condition of excessive load current, therefore, the control current supplied to control windings 39 and 41 is sharply reduced to a low value determined by the resistance of resistor 58 which shunts the emitter-collector path of transistor 57. The reduced control current supplied to windings 39 and 41 results in the p-n-p devices 25 and 26 respectively being made conductive very late in the successive half cycle periods of the alternating-current supply source, thus abruptly decreasing the current supplied from the output of the controlled rectifier 10 to the load circuit.

It will be observed from FIG. 4 that if the connections to the base and emitter electrodes of transistor 70 were reversed, the transistor would be turned on for values of input voltage $E_{in}$ greater than $E_0$ and off for values of input voltage greater than zero and less than $E_0$.

Increased sensitivity of the circuit comprising the bridge 71 and transistor 70 can be obtained by employing resistors 72 and 73 the resistance of which increases with increased current flowing through the resistors, as depicted by the curve B of FIG. 5. For comparison, curve A shows the forward resistance characteristic of each of the rectifier diodes 74 and 75 and the dash line C shows the characteristic of a linear resistor. The intersection of the curves A and B is the point at which the bridge is balanced and its output equal to zero.

Where it is desired to compensate for a temperature coefficient of resistance of rectifier elements 74 and 75, resistors 72 and 73 may be chosen having a temperature coefficient of resistance equal to that of the rectifier elements at the balance point of the bridge so that, at the input voltage $E_0$, the bridge output voltage reverses in polarity irrespective of ambient temperature.

What is claimed is:

1. Impedance controlling apparatus comprising a transistor having a pair of electrodes upon which a control voltage may be impressed, a bridge circuit comprising a first pair of similar resistance elements in opposite arms of the bridge respectively and a second pair of similar resistance elements in the remaining opposite arms of the bridge respectively, the resistance of and voltage drop across each of the elements of one of said pairs at least varying in accordance with the current flowing therethrough, means for connecting a first pair of opposite vertices of said bridge to said pair of electrodes respectively, and means for impressing upon the remaining pair of opposite vertices of said bridge a unidirectional voltage which may vary over the range of amplitudes including amplitudes larger than and smaller than amplitude at which the resistances of and voltage drop across the resistance elements of the first and second pair respectively are equal.

2. In combination, a bridge circuit having a pair of similar asymmetrically conducting elements in one pair of opposite arms respectively and having a pair of resistors in the remaining pair of opposite arms respectively, a transistor having electrodes including an emitter and a base, means for connecting one pair of opposite vertices of said bridge to said emitter and base electrodes respectively, and means for impressing upon the remaining pair of opposite vertices of the bridge a unidirectional voltage which may vary over a range including voltages above and below a predetermined value, each of said asymmetrically conducting elements being poled to cause current to flow therethrough in the forward direction, the resistance of and voltage drop across each of said asymmetrically conducting elements and the resistance of and voltage drop across each of said resistors being equal when said unidirectional voltage has said predetermined value.

3. In combination, a bridge circuit having in one pair of opposite arms a first pair of similar resistance elements the resistance of each of which increases in response to increase of current flowing therethrough and having in the remaining pair of opposite arms a second pair of similar resistance elements the resistance of each of which decreases and the voltage drop across each of which increases in response to increase of current flowing therethrough, a transistor having electrodes including an emitter and a base, means for connecting said emitter and base electrodes to one pair of opposite vertices of said bridge respectively, and means for supplying to the remaining pair of opposite vertices of said bridge unidirectional current the amplitude of which may vary over a range including amplitudes larger than and smaller than a predetermined amplitude at which the resistances of and voltage drop across the resistance elements of said first and second pairs are equal, the polarity of the signal output over said means connecting said emitter and base electrodes being changed responsive to receipt of unidirectional current having an amplitude larger than said predetermined amplitude.

4. The combination with a transistor having emitter, base and collector electrodes of means for controlling the conductance between said emitter and collector electrodes comprising a bridge circuit having a first pair of similar resistance elements in opposite arms of the bridge respectively and a second pair of similar resistance elements in the remaining opposite arms of the bridge respectively, the resistance of voltage drop across each of the elements of one of said pairs of resistance elements at least varying in response to the current flowing therethrough, the resistance of and voltage drop across the resistance elements in the arms of said bridge respectively being equal when current of a predetermined amplitude flows therethrough, means for connecting a first pair of opposite vertices of said bridge to said emitter and base electrodes respectively, and means for impressing upon the remaining pair of opposite vertices of said bridge a unidirectional voltage for causing current to flow through the resistance elements in the arms of said bridge circuit, the amplitude of which may vary over a range including amplitudes larger than and smaller than said predetermined amplitude, said transistor being operated to cutoff responsive to the flow of current through said resistance elements greater than said predetermined amplitude.

5. A rectifying bridge circuit having first, second, third and fourth arms comprising first, second, third and fourth rectifying elements respectively, a pair of output terminals to which a load may be connected, a common terminal of said first and second rectifying elements forming the positive output terminal and a common terminal of said third and fourth rectifying elements forming the negative output terminal, a pair of input terminals to which a source of alternating voltage may be connected, the vertex formed by said first and third arms being a first input terminal and the vertex formed by said second and fourth arms being a second input terminal, a first and second inductance winding in said first and third arms respectively, said windings having a common terminal connected to said first input terminal, a fifth and a sixth rectifying element, a potentiometer, a circuit comprising a portion only of said second winding, said fifth rectifying element, said potentiometer, said sixth rectifying element and a portion only of said first winding all in series, said fifth and sixth rectifying devices being poled in the same direction in said circuit, and means for connecting the variable tap of said potentiometer to said second input terminal.

6. Apparatus for supplying rectified current from an alternating-current supply source to a load comprising a bridge circuit having first, second, third and fourth arms, the vertex of said first and second arms forming a first input terminal connected to said supply source, the vertex of said third and fourth arms forming a second input terminal connected to said supply source, first, second, third and fourth rectifying elements in said first, second, third and fourth arms respectively, the vertex of said first and third arms forming a positive load terminal, the vertex of said second and fourth arms forming a negative load terminal, a first and a second electromagnetic device each having a gate winding and a control winding on a core of magnetic material, means for connecting said gate windings in said first and second bridge arms respectively, said gate windings having a common terminal connected to said first input terminal, a fifth and a sixth rectifying device, a first circuit comprising in series said current source, a portion only of the gate winding of said second electromagnetic device and said fifth rectifying device poled for relatively low resistance conduction during half cycle periods of one polarity when said first input terminal is positive with respect to said second input terminal, and a second circuit comprising in series said current source, a portion only of the gate winding of said first electromagnetic device and said sixth rectifying device poled for relatively low resistance conduction during half cycle periods of opposite polarity.

7. Apparatus in accordance with claim 6 in which there is provided means for energizing said control windings to set up in the core of said first electromagnetic device a magnetomotive force which aids the magnetomotive force due to load current supplied to its gate winding during half cycle periods of said one polarity and to set up in the core of said second electromagnetic device a magnetomotive force which aids in magnetomotive force due to load current supplied to its gate winding during half cycle periods of said opposite polarity.

8. Apparatus for supplying rectified current from an alternating-current supply source to a load circuit including a load comprising a rectifier having an input connected to said supply source and an output connected to said load circuit, a p-n-p-n semiconductor device having a pair of control electrodes to which may be supplied a control current for controlling the output current of said rectifier, a rectifying bridge circuit having first, second, third and fourth arms, the vertex of said first and second arms forming a first input terminal, the vertex of said third and fourth arms forming a second input terminal, means for connecting said first and second input terminals to said alternating-current supply source, a first and second electromagnetic device each having a gate winding and a control winding on a core of magnetic material, said first arm comprising a first of said gate windings and a first rectifying element in series, said second arm comprising a second of said gate windings and a second rectifying device in series, said gate windings having a common terminal connected to said first input terminal, a third and a fourth rectifying element in said third and fourth arms respectively, the vertex of said first and third arms forming a positive output terminal, the vertex of said second and fourth arms forming a negative output terminal, a fifth and a sixth rectifying device, a first current path connecting said first and second input terminals comprising in series a portion only of the gate winding of said second electromagnetic device and said fifth rectifying device poled for relatively low resistance conduction when said first terminal is positive with respect to said second terminal, a second current path connecting said first and second input terminals comprising in series a portion only of the gate winding of said first electromagnetic device and said sixth rectifying device poled for relatively low resistance conduction when said second terminal is positive with respect to said first terminal, means for connecting said positive and negative output terminals to the control electrodes of said p-n-p-n device, and means for supplying to said control windings a control current responsive to load voltage changes.

9. Apparatus for controlling the supply of current from a supply source to a load circuit including a load comprising a first and a second transistor each having emitter base and collector electrodes, a control circuit comprising a source of unidirectional current and the emitter-collector paths of said first and second transistors in series, means responsive to load voltage for controlling the emitter-base current of said first transistor, means responsive to load current for controlling the emitter-base current of said second transistor only, and means responsive to the current in said control circuit for controlling the current supplied from said supply source to said load circuit.

10. Apparatus in accordance with claim 9 in which there are provided a bridge circuit comprising a first pair of similar resistance elements in opposite arms of said bridge respectively and a second pair of similar resistance elements in the remaining opposite arms of the bridge respectively, the resistance of each of the elements of one of said pairs at least varying in accordance with the current flowing therethrough, means for supplying a portion of the load current to a first pair of opposite vertices of said bridge, and means responsive to current from the remaining pair of opposite vertices of said bridge for controlling the emitter-base current of said second transistor, the resistance in the arms respectively of the bridge being equal when the load current has a predetermined amplitude.

11. In combination, a p-n-p-n semiconductor device having control means to which current may be supplied for controlling the condition of said device, a first rectifying means comprising said p-n-p-n device for rectifying alternating current supplied thereto from an alternating-current supply source and for supplying a first rectified current to a load circuit including a load, a second rectifying means for rectifying alternating current supplied thereto from said supply source and for supplying a second rectified current to said control means, said second rectifying means comprising a first and second electromagnetic device having first and second gate windings and first and second control windings on first and second cores of magnetic material respectively and means for causing rectified currents to flow through said first gate winding and through a portion only of said second gate winding respectively during half cycle periods of one polarity of said alternating-current source and for causing rectified currents to flow through said second gate winding and through a portion only of said first gate winding respectively during half cycle periods of opposite polarity of said source, a first and a second transistor each having emitter, collector and base electrodes, means for supplying unidirectional current through the emitter-collector paths of said transistors in series to said control windings, means responsive to load voltage for controlling the emitter-base current of said first transistor, and means responsive to load current for controlling the emitter-base current of said second transistor.

12. A combination in accordance with claim 11 in which said last-mentioned means comprises a bridge circuit having substantially equal resistors in one pair of opposite arms and substantially like rectifier elements in the remaining pair of opposite arms, means for supplying a voltage proportional to load current to a pair of opposite vertices of said bridge, and means responsive to the voltage across the remaining pair of opposite vertices of said bridge for controlling the emitter-base current of said second transistor, the forward resistance of each of said rectifier elements being substantially equal to the resistance of each of said resistors when said load current has a predetermined amplitude.

13. Apparatus for supplying a load rectified current from an alternating-current supply source to a load circuit comprising a first rectifier for intermittently supplying current from said source to said load circuit in response to a first control current impressed upon said first rectifier to make it conducting intermittently, means comprising a second rectifier for intermittently supplying current from said source to set up said first control current including output means connected to control elements of said first rectifier for transmitting said first control current thereto in response to a second control current impressed upon said second rectifier to make it conducting intermittently, and load voltage responsive means for setting up said second control current and for supplying it to said second rectifier.

14. In combination, a first rectifier comprising a p-n-p-n semiconductor device for rectifying current from an alternating-current supply source and for supplying the rectified current to a load circuit, means for generating a first control current for said p-n-p-n device to control the output of said first rectifier comprising a second rectifier for rectifying current from said supply source, said second rectifier comprising a saturable reactor having a gate winding and a control winding, and means for deriving from said load circuit and supplying to said control winding a second control current for controlling the output of said second rectifier.

15. In combination, a bridge circuit having a pair of similar asymmetrically conducting elements in one pair of opposite arms respectively and having a pair of resistors in the remaining opposite arms respectively, a transistor having electrodes including an emitter and a base, means for impressing upon a first pair of opposite vertices of said bridge a unidirectional voltage having a range of amplitudes to cause to be set up across the second pair of opposite vertices of said bridge a voltage which increases to a maximum amplitude of one polarity as said unidirectional voltage is increased and which decreases through zero to a voltage of opposite polarity as said unidirectional voltage is further increased, each of said asymmetrically conducting elements being poled to cause current to flow therethrough in the forward or low resistance direction, and means for connecting the opposite vertices of said second pair to said base and emitter electrodes respectively.

16. Apparatus for supplying rectified current from an alternating current supply source to a load circuit comprising a first bridge rectifier circuit including at least one switching member connected in one arm of said bridge circuit for effecting conductivity and nonconductivity of current from said source over said rectifier circuit to said load circuit, means comprising a second rectifier for intermittently supplying a first control current from said source to said switching member in said first bridge rectifier circuit including a control member for varying the conductivity of said second rectifier, different values of said first control current being effective to vary the time of conduction by said one switching member in each cycle of alternating current in the transmission of the current from said source to said load, and load voltage responsive means for providing a second control current to said control member to effect intermittent conductivity of said second rectifier.

References Cited by the Examiner

UNITED STATES PATENTS

| | | | |
|---|---|---|---|
| 2,019,352 | 10/1935 | Livingston | 321—19 |
| 2,751,545 | 6/1956 | Chase | 321—18 |
| 2,751,550 | 6/1956 | Chase | 323—22 |
| 2,858,499 | 10/1958 | Silver | 321—19 |
| 2,875,396 | 2/1959 | Christie et al. | 321—19 |
| 2,903,639 | 9/1959 | Meszaros | 321—18 |
| 2,903,640 | 9/1959 | Bixby | 321—19 |
| 2,914,720 | 11/1959 | Merkel | 321—19 |
| 2,945,172 | 7/1960 | Bixby | 321—19 |
| 2,946,946 | 7/1960 | Schohan | 323—89.1 |

OTHER REFERENCES

General Electric Controlled Rectifier Manual, edited by Semiconductor Products Dept., March 21, 1960, pages 157–159.

LLOYD McCOLLUM, *Primary Examiner.*

SAMUEL BERNSTEIN, ROBERT L. SIMS, *Examiners.*